Sept. 28, 1943.  F. W. MEREDITH ET AL  2,330,729
SHOCK-WITHSTANDING BEARING
Filed Nov. 19, 1942
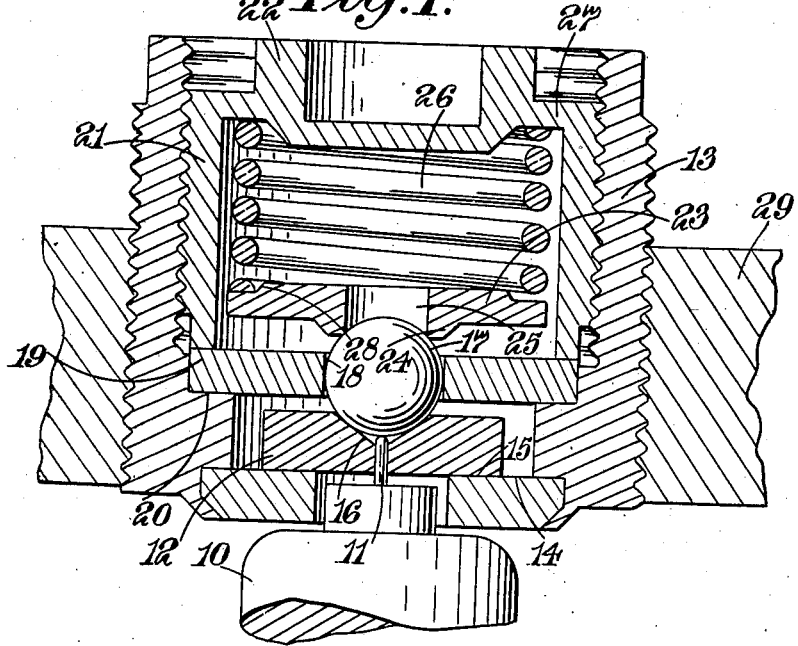
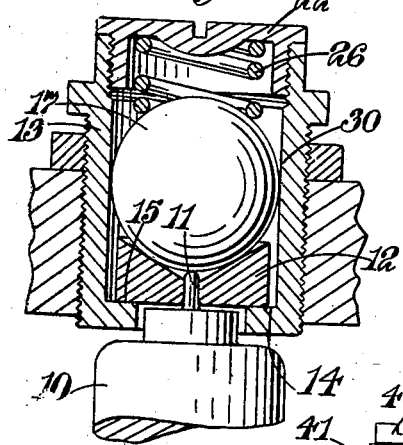
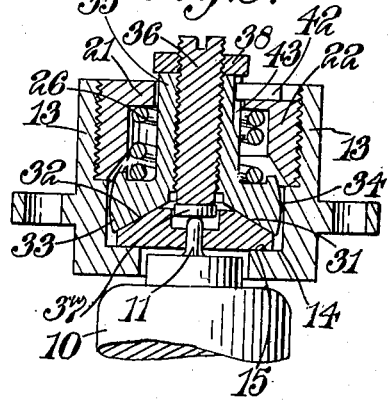

Patented Sept. 28, 1943

2,330,729

UNITED STATES PATENT OFFICE 2,330,729

SHOCK-WITHSTANDING BEARING

Frederick William Meredith and Francis Henry Owens, London, England, assignors to S. Smith & Sons (Motor Accessories) Limited, Cricklewood, London, England, a British company Application November 19, 1942, Serial No. 466,162
In Great Britain August 18, 1941

13 Claims. (Cl. 308—163)

This invention relates to shock-withstanding bearings, and particularly to bearings of a delicate nature, for example gimbal mounted bearings for a gyroscopic apparatus, which bearings must not be subjected to substantial shock, since otherwise they would be liable to fracture.

It is known for example, for the part of the bearing which receives the rotating member or journal (which part is hereinafter referred to as the bearing element) normally to be centered by a suitably shaped face thereof which engages a suitably shaped face of a support, and to maintain these faces normally in contact by a resiliently pressed thrust member, which thrust member is free to move both axially and radially should the resilient pressure be overcome.

According to this invention a resilient bearing comprises a housing, a bearing element supported by a face of said housing arranged transverse to the axis of rotation, a thrust member constrained against radial movement within the housing and arranged to engage the bearing element, resilient means for pressing the thrust member axially against the bearing element and the bearing element against the transverse face of the housing, the engaging faces of which bearing element and thrust member are adapted to centre the bearing element under the action of the resilient means but which permit radial movement of the bearing element should the centering action of the resilient means be overcome. Preferably, the transverse face of the housing and the face of the bearing element which it supports are flat.

The interengaging faces of the thrust member and bearing element may be spherical and conical. For example, the thrust member may be provided with a spherical face which engages a conical depression in the bearing element, or vice versa.

In one form of construction the thrust member comprises a ball which is located in a cylindrical bore formed in said casing, or in a part secured within said casing.

Alternatively, the interengaging faces of the thrust member and bearing element are conical. In such an arrangement the thrust member may be provided with a curved peripheral face such as a spherical face which is located by a cylindrical wall of the casing.

In any of the arrangements referred to above, the resilient means may comprise a helical compression spring arranged between a face of the housing and said thrust member or a part carried by said member.

Alternatively, the resilient means may comprise a resilient diaphragm or other flat spring clamped at its periphery to said casing and arranged to engage said thrust member at its centre.

The rotating member supported by the bearing element may be provided with a journal stem which projects through a bore in the bearing element and engages the thrust member or a part secured thereto. For example, the thrust members may be provided with an axially adjustable palate which engages the end of the stem.

The following is a description of a number of embodiments of the invention, reference being made to the drawing, in which all of Figures 1 to 4 represent cross sections through the bearing along the axis of rotation.

Referring to Figure 1, the end of the rotating part 10 is provided with a stem 11 which is supported within a bore formed in the journal supporting plate or bearing element 12. The bearing element is located within a casing 13 provided with a flat shoulder 14 against which a flat face 15 of the bearing element rests. The opposite face of the bearing element is provided with a conical depression 16 in which is located a thrust member in the form of a ball 17. The ball is constrained to move in an axial direction by reason of the fact that it is located in an axial cylindrical bore 18 formed in a plate 19 locked between a shoulder 20 of the casing and the rim 21 of an externally threaded closure plug 22. Located within the closure plug is a spring holder 23 which is centered on the ball 17 by a rim 24 having a central bore 25. A helical compression spring 26 is arranged between the spring holder 23 and a top wall 27 of the closure plug 22, and is centered on the holder by the cut-away portion 28. The stem 11 projects through the bore in the bearing element and engages the ball 17.

The casing is externally threaded for adjustment in the part 29 with which the bearing is to be employed.

The bearing shown in Figure 2 is of a somewhat simpler form. The spring holder and the guiding plate 19 of the first construction are dispensed with and the ball 17 is constrained to move axially by a cylindrical wall 30 of the casing which surrounds it. The helical compression spring 26 is arranged to engage the ball directly.

In the arrangement shown in Figure 3 the journal is provided with a conical projection 31 which is received in a conical recess 32 in the thrust member. The thrust member is provided with a part-spherical peripheral surface 33 which is located centrally by the cylindrical wall 34 of the casing 13. The thrust member is also provided with a stem 35 which projects through a central hole in the closure plug 22. The helical compression spring 26 is disposed between an end wall of the closure plug and a shoulder formed between the stem and the head of the thrust member. The stem is provided with an internally threaded bore to receive an adjusting screw 36, the end of which is provided with a floating palate 37, against which the end of the stem 11 abuts. The adjusting screw is retained in the required position by a lock-nut 38, the thrust member being prevented from turning, during adjustment, by a key 43 in its stem 35, engaged by a key member 42 fixed in the plug 22.

The arrangement shown in Figure 4 is similar to that last described above, but the helical spring is replaced by a resilient diaphragm 39 which is clamped centrally by screws 40 to a rim 41 formed on the casing, and is secured at its centre within a suitable groove formed in the thrust member.

We claim:

1. A shock-withstanding bearing comprising a housing formed with an internal face arranged transverse to the axis of rotation, a bearing element movably supported by said face, a thrust member constrained against radial movement within the housing and arranged to engage the bearing element, resilient means for pressing the thrust member axially against the bearing element and the bearing element against the transverse face of the housing, the engaging faces of the bearing element and thrust member being so constructed and arranged as to centre the bearing element under the action of the resilient means, but to permit radial movement of the bearing element against said internal face should the centering action of the resilient means be overcome.

2. A shock-withstanding bearing comprising a housing formed with an internal flat face arranged transverse to the axis of rotation, a bearing element also formed with a flat transverse face and arranged with said face in engagement with a face of the housing, a thrust member constrained against radial movement within the housing and arranged to engage the bearing element, resilient means for pressing the thrust member axially against the bearing element and the bearing element against the transverse face of the housing, the engaging faces of which bearing element and thrust member are adapted to centre the bearing element under the action of the resilient means, but which permit radial movement of the bearing element should the centering action of the resilient means be overcome.

3. A shock-withstanding bearing comprising a housing having an internal face arranged transverse to the axis of rotation, a bearing element having a face supported by the face of the housing, a thrust member constrained against radial movement within the housing, which thrust member and bearing element are provided with interengaging faces, one of which is spherical, resilient means for pressing the thrust member axially against the bearing element and the bearing element against the transverse face of the housing, whereby the bearing element is centered under the action of the resilient means, but is permitted to move radially should the centering action of the resilient means be overcome.

4. A shock-withstanding bearing comprising a housing formed with an internal face transverse to the axis of rotation, a bearing element having a transverse face supported by the face of the housing, a thrust member constrained against radial movement within the housing and having a spherical face and which bearing element is provided with a conical depression for engaging said spherical face, resilient means for pressing the thrust member axially against the bearing element and the bearing element against the transverse face of the housing, which interengaging spherical and conical faces of the bearing element and thrust member are adapted to centre the bearing element under the action of the resilient means, but which permit radial movement of the bearing element should the centering action of the resilient means be overcome.

5. A shock-withstanding bearing comprising a cylindrical housing formed with an internal face arranged transverse to the axis of rotation, a bearing element formed with a transverse face supported by the face of the cylindrical housing, a ball located in the housing and engaging the internal cylindrical wall thereon, which bearing element is provided with a depression adapted to engage said ball, resilient means for pressing the ball against the bearing element and the bearing element against the transverse face of the housing, which ball and depression are adapted to centre the bearing element under the action of the resilient means, but which permit radial movement of the bearing element should the centering action of the resilient means be overcome.

6. A shock-withstanding bearing comprising a housing formed with an internal face arranged transverse to the axis of rotation, a bearing element formed with a transverse face supported by the face of said housing, a thrust member having a conical face and which is constrained against radial movement within the housing, a bearing element having a conical face engaged by the conical face of the thrust member, resilient means for pressing the thrust member axially against the bearing element and the bearing element against the transverse face of the housing, which conical engaging faces of the bearing element and thrust member are adapted to centre the bearing element under the action of the resilient means, but which permit radial movement of the bearing element should the centering action of the resilient means be overcome.

7. A shock-withstanding bearing comprising a cylindrical housing formed with an internal face arranged transverse to the axis of rotation, a bearing element formed with a transverse face supported by the face of the housing, a thrust member having a curved peripheral face engaging the cylindrical housing and having a conical transverse face, which bearing element is provided with a conical face for engaging the conical face of the thrust member, resilient means for pressing the thrust member axially against the bearing element and the bearing element against the transverse face of the housing, which conical engaging faces of the bearing element and thrust member are adapted to centre the bearing element under the action of the resilient means, but which permit radial movement of the bearing element should the centering action of the resilient means be overcome.

8. A shock-withstanding bearing comprising a cylindrical housing formed with an internal face transverse to the axis of rotation, a bearing element formed with a face supported by the face of the housing, a thrust member having a curved peripheral face engaging the cylindrical housing and having a conical transverse face which bearing element is provided with a conical face for engaging the conical face of the thrust member, resilient means for pressing the thrust member axially against the bearing element and the bearing element against the transverse face of the housing, which conical engaging faces of the bearing element and thrust member are adapted to centre the bearing element under the action of the resilient means, but which permit radial movement of the bearing element should the centering action of the resilient means be overcome.

9. A shock-withstanding bearing comprising a housing formed with an internal face arranged transverse to the axis of rotation and with an abutment spaced axially away from said face, a bearing element supported on said face, a thrust member constrained against radial movement within the housing and arranged to engage the bearing element, a helical spring arranged between the abutment and said thrust member for pressing the thrust member against the bearing element and the bearing element against the transverse face of the housing, the engaging faces of which bearing element and thrust member are adapted to centre the bearing element under the action of the spring but permit radial movement of the bearing element should the centering action of the resilient means be overcome.

10. A shock-withstanding bearing comprising a housing formed with an internal face transverse to the axis of rotation, a bearing element having a transverse face supported by the face of the housing, a thrust member constrained against radial movement within the housing and arranged to engage the bearing element, a flat spring means for clamping the spring at its edges to said housing which spring is arranged to engage said thrust member so as to press the thrust member axially against the bearing element and the bearing element against the transverse face of the housing, which bearing element and thrust member are provided with engaging faces adapted to centre the bearing element under the action of the flat spring, but which permits radial movement of the bearing element should the centering action of the resilient means be overcome.

11. A shock-withstanding bearing comprising a housing formed with an internal face transverse to the axis of rotation, a bearing element having a transverse face supported by the face of the housing, a thrust member constrained against radial movement within the housing and arranged to engage the bearing element, a resilient diaphragm, means for clamping the edge of the diaphragm to said housing which diaphragm is arranged to engage said thrust member at its centre so as to press the thrust member axially against the bearing element and the bearing element against the transverse face of the housing, which bearing element and thrust member are provided with engaging faces adapted to centre the bearing element under the action of the resilient diaphragm, but which permit radial movement of the bearing element should the centering action of the resilient means be overcome.

12. A shock-withstanding bearing comprising a housing formed with an internal face transverse to the axis of rotation, a bearing element having an axial bore and an external face supported by the face of the housing, a thrust member constrained against radial movement within the housing and arranged to engage the bearing element, resilient means for pressing the thrust member axially against the bearing element and the bearing element against the transverse face of the housing, which bearing element and thrust member are provided with engaging faces adapted to centre the bearing element under the action of the resilient means but which permit radial movement of the journal should the centering action of the resilient means be overcome, a rotating member supported in said bearing element, a stem on said rotating member, which bearing element is arranged to project through the bore in the bearing element and engage the thrust member.

13. A shock-withstanding bearing comprising a housing formed with an internal face transverse to the axis of rotation, a bearing element formed with an axial bore and provided with an external transverse face supported by the face of the housing, a thrust member constrained against radial movement within the housing and arranged to engage the bearing element, an adjustable palate on said thrust member, resilient means for pressing the thrust member axially against the bearing element and the bearing element against the transverse face of the housing, which bearing element and thrust member are provided with engaging faces adapted to centre the bearing element under the action of the resilient means but which permits radial movement of the bearing element should the centering action of the resilient means be overcome, a rotating member supported in said bearing element, a stem on said rotating member arranged to project through said bore and engage the adjustable palate on the thrust member.

FREDERICK WILLIAM MEREDITH.
FRANCIS HENRY OWENS.